United States Patent
Zasypkin et al.

(10) Patent No.: US 11,026,446 B2
(45) Date of Patent: Jun. 8, 2021

(54) HIGH INTEGRITY ENCAPSULATION PRODUCT

(71) Applicant: McCORMICK & COMPANY, INCORPORATED, Hunt Valley, MD (US)

(72) Inventors: Dmitriy Zasypkin, Cockeysville, MD (US); Shriram Paranjpe, Sparks, MD (US); Michael Reick, Westminster, MD (US); Chungsea Shen, Cockeysville, MD (US)

(73) Assignee: MCCORMICK & COMPANY, INCORPORATED, Hunt Valley, MD (US)

( * ) Notice: Subject to any disclaimer, the term of this patent is extended or adjusted under 35 U.S.C. 154(b) by 0 days.

(21) Appl. No.: 16/064,777

(22) PCT Filed: Dec. 21, 2016

(86) PCT No.: PCT/US2016/068009
§ 371 (c)(1),
(2) Date: Jun. 21, 2018

(87) PCT Pub. No.: WO2017/112763
PCT Pub. Date: Jun. 29, 2017

(65) Prior Publication Data
US 2019/0008202 A1  Jan. 10, 2019

Related U.S. Application Data

(60) Provisional application No. 62/270,797, filed on Dec. 22, 2015.

(51) Int. Cl.
*A23P 10/30* (2016.01)
*A23P 30/20* (2016.01)
(Continued)

(52) U.S. Cl.
CPC ............... *A23P 10/30* (2016.08); *A23L 27/72* (2016.08); *A23L 29/219* (2016.08); *A23P 30/20* (2016.08); *A23V 2002/00* (2013.01)

(58) Field of Classification Search
CPC .......... A23P 10/30; A23P 30/20; A23L 27/72; A23L 29/219
See application file for complete search history.

(56) References Cited

U.S. PATENT DOCUMENTS

| | | | |
|---|---|---|---|
| 4,384,004 A | * | 5/1983 | Cea .......................... A23G 4/10 426/3 |
| 5,603,971 A | | 2/1997 | Porzio et al. |
| | | | (Continued) |

FOREIGN PATENT DOCUMENTS

| | | |
|---|---|---|
| ES | 2 295 359 | 4/2008 |
| WO | 02/065858 | 8/2002 |

OTHER PUBLICATIONS

Official Communication issued in European Patent Office (EPO) Patent Application No. 16880023.3, dated Nov. 8, 2019.
(Continued)

*Primary Examiner* — Katherine D Leblanc
(74) *Attorney, Agent, or Firm* — Greenblum & Bernstein, P.L.C.

(57) ABSTRACT

High Integrity Encapsulation Product with Insoluble Fibers. A particulate extrusion encapsulation product in a glassy state is described including an encapsulate, encapsulated in a glassy matrix. The glassy matrix includes at least one modified starch, at least one carbohydrate and at least one insoluble fiber. The load of the encapsulate is typically from 0.01% to 20% by weight, based on the total weight of the encapsulation product. A method of making the particulate extrusion encapsulation product and food products containing the extrusion encapsulation product are also described.

37 Claims, 3 Drawing Sheets

F.I. = 0

F.I. = 1

(51) Int. Cl.
*A23L 27/00* (2016.01)
*A23L 29/219* (2016.01)

(56) References Cited

U.S. PATENT DOCUMENTS

| | | | |
|---|---|---|---|
| 5,817,381 A * | 10/1998 | Chen | C08B 15/08 |
| | | | 428/34.8 |
| 6,120,803 A | 9/2000 | Wong et al. | |
| 6,500,463 B1 | 12/2002 | Van Lengerich | |
| 7,488,503 B1 | 2/2009 | Porzio et al. | |
| 8,828,423 B2 * | 9/2014 | Boghani | A23G 3/0017 |
| | | | 424/440 |
| 2006/0251768 A1 | 11/2006 | Bouquerand | |
| 2011/0071119 A1 | 3/2011 | Davis | |
| 2011/0256199 A1 | 10/2011 | Zasypkn | |
| 2014/0272011 A1 | 9/2014 | Zasypkin et al. | |

OTHER PUBLICATIONS

Chinese Office Action (with English translation) dated Apr. 27, 2020 issued in Application No. 201680075198.7.
Russian Office Action dated Mar. 19, 2020 issued in the corresponding Russian patent application No. 2018123512 with its English Translation.
Russian Search Report dated Mar. 13, 2020 for corresponding Russian Application No. 2018123512.
Russian Office Action dated Aug. 19, 2020 issued in the corresponding Russian patent application No. 2018123512 with its English Translation.
Australian Office Action dated Jun. 17, 2020 issued in Australian Application No. 2016378574.
Official Communication issued in European Patent Office (EPO) Patent Application No. 16880023.3, dated Aug. 1, 2019.

* cited by examiner

HIGH INTEGRITY ENCAPSULATION PRODUCT

CROSS-REFERENCE TO RELATED APPLICATIONS

The present application claims the benefit of U.S. Provisional Application Ser. No. 62/270,797 filed Dec. 22, 2015, the disclosure of which is expressly incorporated by reference herein in its entirety.

TECHNICAL FIELD

The field of art to which this invention generally pertains is encapsulation technology, and specifically the encapsulation of active ingredients, such as flavors.

BACKGROUND

The encapsulation of encapsulates is an area of active research. In particular, the encapsulation of encapsulates such as medications, pesticides (including insecticides, nematocides, herbicides, fungicides, microbiocides, etc.) preservatives, vitamins, flavoring agents, and other encapsulates, is desired for a number of reasons. In the case of medications and pesticides, encapsulation may be desired to achieve the controlled release of the medication or pesticide. For vitamins, encapsulation may be carried out to protect the vitamin from air-oxidation and, thus, to extend shelf life of the vitamin. In the case of flavoring agents, the encapsulation may be carried out to place the flavoring in an easily metered form which will release the agent at a controllable event, such as the addition of water.

One problem with encapsulates produced in the past is with the integrity of the encapsulation. If the integrity of the encapsulation is compromised in any way, in addition to loss of appearance, deleterious chemical reactions such as oxidation of encapsulated actives, e.g., flavors, medications, etc. can result on surfaces exposed both during and after drying, and there is potential for premature release of the encapsulate (and flavor loss, for example), both before hydration, during storage, and/or rapid release upon hydration, whether desired or not.

The embodiments described herein address these challenges.

BRIEF SUMMARY

A particulate extrusion encapsulation product is described, including an encapsulate, encapsulated in a glassy matrix containing at least one modified starch, and at least one low molecular weight carbohydrate. The glassy matrix additionally contains about 0.5% to about 10% by weight of at least one insoluble fiber, resulting in improved integrity of the encapsulation product.

Additional embodiments include: the product described above where the insoluble fiber comprises about 3% to about 8% by weight; the product described above where at least 80% of the particles in the particulate product are unbroken, based on total number of particles in the particulate product; the product described above where at least 85% of the particles in the particulate product are unbroken, based on total number of particles in the particulate product; and the product described above where at least 90% of the particles in the particulate product are unbroken, based on total number of particles in the particulate product.

Additional embodiments include: the product described above where the average size of the fibers is about 20 to about 300 microns; the product described above where the average size of the fibers is about 50 to about 200 microns; the product described above where the average size of the fibers is about 75 to about 150 microns; the product described above where the matrix contains about 49% to about 94% by weight of the modified starch and about 5% to about 50% of the low molecular weight carbohydrate; and the product described above where the low molecular weight carbohydrate has an average molecular weight less than 800 g/mol (grams per mole).

Additional embodiments include: the product described above where the low molecular weight carbohydrate comprises a sugar, polyol, corn syrup solid, or mixtures thereof; the product described above where the amount of encapsulate contained in the product is from about 0.01% to about 20% by weight, based on the total weight of the extrusion encapsulation product; the product described above where the amount of encapsulate contained in the product is from about 4% to about 12% by weight, based on the total weight of the extrusion encapsulation product; the product described above where the amount of encapsulate contained in the product is from about 8% to about 10% by weight, based on the total weight of the extrusion encapsulation product; the product described above where the amount of encapsulate contained in the product is at least 8% by weight, based on the total weight of the extrusion encapsulation product; the product described above where the particulate product has an average particle size of 0.1 mm to 7 mm; the product described above where the particulate product has an average particle size of 0.3 mm to 3 mm; the product described above where the particulate product particles has an average particle size of 0.6 mm to 2 mm; the product described above where the particulate product has a glass transition temperature of from 25° C. to 80° C.; and the product described above where the modified starch comprises n-octenylsuccinic acid anhydride modified starch.

Additional embodiments include: the product described above where the insoluble fiber comprises apple fiber, blueberry fiber, citrus fiber, sugarcane fiber, oat fiber, wood fiber, cellulose fiber, microcrystalline cellulose fiber, cotton fiber, rice fiber, wheat fiber or mixtures thereof; the product described above where the low molecular weight carbohydrate comprises maltose, trehalose, dextrose, lactose, fructose, xylose, sucrose, corn syrup solids, erythritol, maltitol, mannitol, xylitol, sorbitol, lactitol or mixtures thereof; the product described above where the encapsulate comprises a flavor, fragrance, vitamin, dietary supplement, medication or mixtures thereof; the product described above where the encapsulate comprises a flavor; the product described above where the flavor is a natural flavor, natural extract, oleoresin, essential oil, protein hydrolyzate, reaction flavor, artificial flavor, compounded flavor or mixtures thereof; the product described above additionally containing a plasticizer comprising water, glycerin, propylene glycol, carbohydrate solution or mixtures thereof; the product described above where the glassy matrix contains up to 2% by weight of an anti-sticking agent; the product described above where the anti-sticking agent comprises a calcium, magnesium, sodium, or potassium salt of a fatty acid; silicon dioxide; titanium dioxide; a wax, including beeswax, carnauba wax, candelilla wax; or mixtures thereof; the product described above additionally containing up to about 70% by weight maltodextrin; the product described above additionally containing up to about 10% by weight of at least one gum; and the product described above where the gum comprises xanthan gum, alginate, carrageenan, pectin or mixtures thereof.

A method of making a particulate extrusion encapsulation product is also described, including, in an extruder assembly, mixing and melting matrix components comprising a matrix and an encapsulate to form a viscous dispersion, shaping, extruding, and die-face cutting the viscous dispersion to obtain a particulate extrusion encapsulation product, and drying and cooling the particulate extrusion encapsulation product to a glassy state, where the matrix components additionally contain about 0.5% to about 10% by weight of at least one insoluble fiber.

Additional embodiments include: the method described above where the insoluble fiber includes apple fiber, blueberry fiber, citrus fiber, sugarcane fiber, oat fiber, wood fiber, cellulose fiber, microcrystalline cellulose fiber, cotton fiber, rice fiber, wheat fiber or mixtures thereof; the method described above where the encapsulate comprises a flavor; the method described above where the flavor is a natural flavor, natural extract, oleoresin, essential oil, protein hydrolyzate, reaction flavor, artificial flavor, compounded flavor or mixtures thereof; the method described above additionally containing up to about 70% by weight maltodextrin; the method described above additionally containing up to about 10% by weight of at least one gum; the method described above where the gum comprises xanthan gum, alginate, carrageenan, pectin or mixtures thereof.

These and additional embodiments are further described below.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Encapsulated flavors, as well as other particle extrusion encapsulation compositions, can effectively deliver flavors and other products in multiple applications. Most recent versions of the technology employ processes that can create a variety of well-defined shapes of flavored particles, for example. These shapes and sizes can vary from rods to spheres to flakes of various sizes and aspect ratios. Size and shape of the particles are controlled by cutting of the extruded strands at various cutting speeds. Since water is typically used to melt matrix components in the extrusion process the final processing step is the drying process. This assures stable product in a glassy state. It has been found for a variety of matrices and particle shapes that the drying process can result in the development of cracks and ultimately breaking of particles. As described herein, it has been discovered that certain fibers (such as, for example, sugar cane fiber, oat fiber, etc.) in the composition can effectively prevent or minimize breaking of the particles thus better preserving particle integrity and flavor functionality.

It is believed that cracking and ultimately fracturing of particles is related to internal stress induced in glassy polymer-sugar compositions of this invention during drying. The glassy state is a thermodynamically unstable state created by supercooling of the polymer-sugar compositions. In this case the supercooled glassy state is created by both drying and cooling the compositions. Essentially, the supercooled glassy state is created by cooling the melted compositions below its glass transition temperature and also by increasing the glass transition temperature during drying. Drying creates greater internal stress and hence particle cracking and fracturing when compared to cooling.

While there are many factors contributing to degree of cracking and fracturing of glassy particles, two factors have been found to have great impact in minimizing fracturing.

One is the addition of substantially insoluble fibers to the matrix composition. The added fibers have a significant average length typically from 20 to 300 microns. This is much greater than the length of polymer molecules in the composition. In this way the glassy polymer particles are reinforced with the fibers forming a network within the glassy particles. This helps to hold particles together thus minimizing ultimate fracturing and braking of the particles. The fibers do not necessarily completely prevent formation of cracks in the particles.

Another mechanism of minimizing cracking and fracturing is introduced by soluble gums. Essentially, they make the polymer particles tougher, working as internal glue. Typically, the gums have higher molecular weight than the major components of the matrix. Such tougher particles containing gums resist cracking and fracturing better. It has been found however that gums are not as effective as insoluble fibers in preventing the ultimate fracturing and breaking of the particles, although it has been found that some combinations of insoluble fibers and soluble gums could work well together. See, for example, the Table.

It has been found that the addition of 0.5% to 15% by weight (for example 3%, 4%, 5%, 6%, 7% or 8%) of a fiber (which is substantially insoluble in water) to extrusion encapsulation compositions significantly reduces cracking, surface fracturing, and breaking of extruded particles after drying. This improves the integrity of the particles, the flavor, consistency of the product in production, and longer shelf life of encapsulated flavors, among other things. Addition of fibers to matrix compositions is found to be especially beneficial for rod-like and flake-shaped particles. The average size of the fibers is about 20 to 300 microns, and typically about 75 to 200 microns.

The amount of whole intact original particles in a sample is defined as a percentage of whole unbroken particles in the total population of particles by number. Respectively, the amount of broken particles can be calculated as a number percentage of the total number of particles in the sample. Various methods can be employed to evaluate or measure this percentage. For example, the whole particles could be counted directly as a percentage of the total number of particles in a sample. This is especially practical when the particles are relatively large (larger than 1 mm in diameter). For smaller particles, larger samples, and a greater degree of particle breakage, a visual evaluation can be established. In this case a Fracture Index (FI) can be determined by one or more people using a reference chart for visual comparison. In this case the reference chart is developed for each characteristic particle size and shape. Example 1 demonstrates the use of this method.

Alternatively, the whole and broken particles can be automatically counted by conventional image analysis techniques. These techniques involve image analysis of still images and micrographs, or dynamic image analysis in a flow of particles. Instruments for both types of techniques are commercially available.

Another analytical method involves sieve separation and analysis of broken and whole particles. The choice of a separating sieve or sieves in this case is defined by particle sizes and shapes. The broken particles can be separated from whole original particles and the number of particles in both populations can be counted and expressed as a number percentage of the total number of particles. This can be done manually or with the use of conventional automated counters. The amount of broken or whole particles can also be expressed in this case as a weight fraction and weight percentage in a sample. Based on this weight percentage the number and percentage of original particles broken during drying and/or storage can be calculated. For example, the particulate products produced and described herein in Examples 1 and 2 are produsced such that less than 5% by weight of the product passes through a Size 16 U.S. Sieve, less than 10% by weight of the product passes through a Size 16 U.S. Sieve, less than 20% by weight of the product passes through a Size 16 U.S. Sieve.

Melt extrusion processes used for encapsulation of flavors and other materials are mixed and melted in an extruder assembly. The extruder assembly mixes dry blended matrix, with water, and flavor, melt the blend and presses the viscous mass through a die typically with multiple holes. A rotating cutter knife reduces the strands of the melt to particles. Then the particles are typically dried in conventional driers and cooled to ambient temperature.

In this typical process, it has been observed that particles can develop internal cracks (typically within hours) after drying and cooling. Over time the cracks can grow and the particles break into smaller pieces. The degree of drying (and speed or rate of drying) can affect the moisture content of the particles and the degree of fracturing. The lower the moisture of the dried particles the greater is the amount of cracks and broken particles. Undried particles develop very few (if any) cracks and typically do not break. Moisture of the particles in this case is typically above 8%. Especially sensitive to breaking are particles with a high aspect ratio (thickness to diameter above and below 1:1, for example), including such things as rods and thin flakes. Other shapes can be sensitive to fracturing also depending on such things as the size of the particles, their moisture content, and the matrix composition, for example. Matrices containing combinations of chemically modified starches and sugars are found to be particularly sensitive to fracturing.

The addition of the fiber as described herein to the extrusion matrix has been found to significantly reduce cracking and breaking of the extruded particles after drying. This improves the integrity of the particles and flavor, for example, resulting in a longer shelf life of encapsulated flavors, and more consistency in the product, for example, in appearance, among other things. For example, the greater the number or amount of broken particles, the greater the degree of oxidation, which clearly impacts shelf life.

Some examples, as further described below, of the materials which can be used in the glassy matrix described herein include: modified starches such as starches chemically modified with n-octenylsuccinic acid anhydride: low molecular weight carbohydrates (below about 800 g/mol) such as maltose, trehalose, dextrose, lactose, fructose, xylose, sucrose, corn syrup solids, erythritol, maltitol, mannitol, xylitol, sorbitol, and lactitol. While any amounts may be used which accomplish the results described herein, the low molecular weight carbohydrate is typically present in an amount of about 5% to about 50% by weight and more typically about 10% to about 30% by weight, and the modified starch is typically present in the amount of about 50% to about 95% by weight, and more typically about 70% to about 90% by weight.

Insoluble fibers particularly useful with the processes and compositions disclosed herein include: apple fiber, blueberry fiber, citrus fiber, sugarcane fiber, oat fiber, wood fiber, cellulose fiber, microcrystalline cellulose fiber, rice bran fiber, and wheat bran fiber. It has also been found, for example, as demonstrated by the test data below, that the use of some gums in addition to the fiber allows for the use of less fiber to produce the improved products described herein, and similarly allows less gum to be used with the fibers to produce positive effects on the product not present when the gums are used alone. For example, up to 10 percent by weight of the gums added to up to 10 percent by weight of the fibers can produce advantageous results, with typically up to 5 percent fiber plus gum used, e.g., 3% fiber and 2% gums, can produce a tougher, stronger product. The gums are typically high viscosity gums, such as xanthan gum, alginate, pectin, carrageenan, or mixtures thereof, for example.

Plasticizers particularly useful with the processes, products and compositions disclosed herein include: water, glycerin, propylene glycol, a carbohydrate solution and mixtures thereof. Depending on the amount of water, for example, already present or contained in the materials being added, although not typical, no additional water or other plasticizer may be needed to be directly added to the composition during the mixing to obtain the desired plasticizing effect.

Anti-sticking agents may also be used with the compositions described herein. Particularly useful with the processes and compositions disclosed herein are, alone or in combination: calcium, magnesium, sodium, and potassium salts of a fatty acids; waxes including beeswax, carnauba wax, candelilla wax; silicon dioxide; and titanium dioxide. If used, they are typically present in the product in amounts of about 0.25% to about 1% by weight.

Representative encapsulants, which may be encapsulated as part of the compositions and with the processes described herein include such things as flavors, fragrances, vitamins, dietary supplements, and medications. The resultant encapsulated products can be used as part of any flavored food product or food system (topically applied and/or mixed internally into the system) such as extruded cereal, crackers, cereal bars, snack chips, dough and frozen dough, bakery products such as, for example, bread and muffins, and dry beverage blends. When used in such systems, the encapsulated product is typically present in amounts up to about 3% by weight, for example, about 0.1% to about 1% percent flavor particles added.

In processing, the materials described herein are typically added to an extruder assembly, and mixed and melted to form a viscous dispersion. The individual components of the composition can be added either sequentially or at the same time, as long as all of the components are mixed and melted prior to extrusion. After melting, the mixture is extruded through a die with a plurality of openings, and the formed strands cut into particles as they are extruded. Depending on the speed of the extruder and of the cutter, particles in the shape of rods, spheres or pillows, or relatively thin disks or flakes are formed.

See also the following examples and commonly assigned U.S. patents and pending and published patent applications for additional information relating to compositions, processes and products described herein, the disclosures of which are herein incorporated by reference: U.S. Pat. Nos. 5,603,971; 6,187,351; 6,790,453; 7,488,503; 7,799,341; 8,257,738; and 9,119,411; and U.S. Published Patent Applications Nos: 2013/0243851; and 2014/0272011.

Example 1

A matrix composition which included 90% by weight of n-octenylsuccinic acid anhydride (OSAN) modified starch (CAPSUL™ starch, Ingredion), and 10% dextrose monohydrate was dry blended and fed at 250 g/min (grams/minute) into a 2 inch extruder assembly fitted with temperature-controlled jackets, liquid injection ports in the feeding zone of the assembly, and a multi-orifice die perforated with ⅛ inch randomly shaped holes. Deionized water was metered into the feed port at 30-40 g/min. The extruder jacket temperature was maintained at 180-220° F. A McCormick cheddar cheese flavor was metered into the mix, targeting 8% flavor load by weight of the final encapsulation product. The encapsulation composition was extruded through the die, and die-face cut to generate particles. The particles were collected on a tray then dried for 10 min in a fluidized bed type drier at 190-210° F. air temperature. The particles were cooled on a tray at ambient temperature.

The resultant glassy solid particles contained 6.0% water (Karl-Fisher method) and expressed glass transition temperature (Tg) 64.2° C., heat capacity change $\Delta Cp=0.14$ Joules/(gram ° C.) as determined using modulated differential scanning calorimeter Q2000 (TA Instruments). The particle density was measured with a Micromeritics powder pycnometer (model AccuRys 1330) and found to be 1.44 g/cc. (it is important that the glass transition temperature of the dried particles is above room temperature or the particles will otherwise get sticky and cake resulting in subsequent handling difficulties and flavor loss).

Figure 1A:
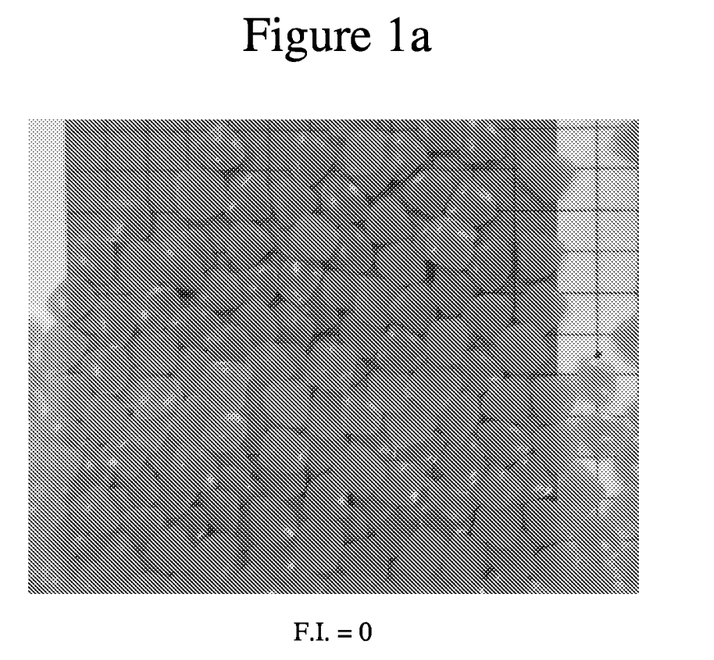
FIGS. 1a to 1f depict representative Fracture Index reference charts.
Figure 1B:
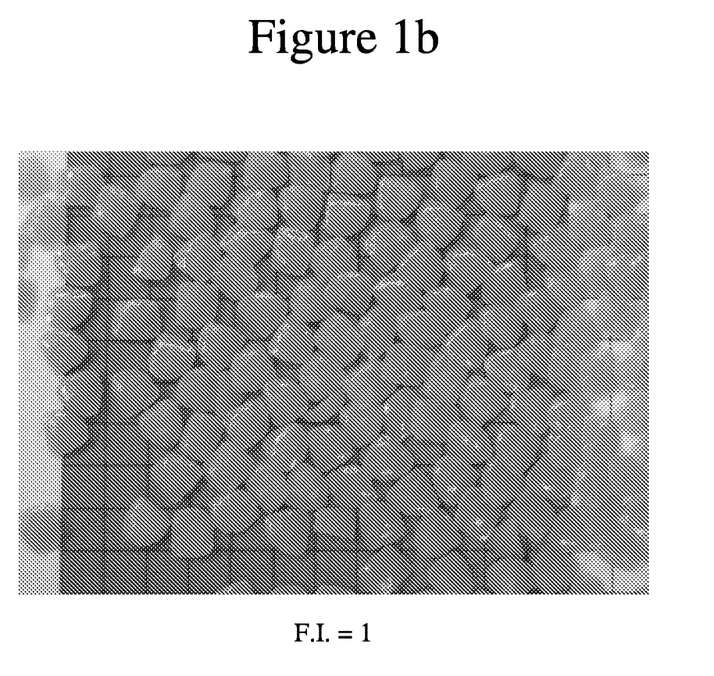
Figure 1C:
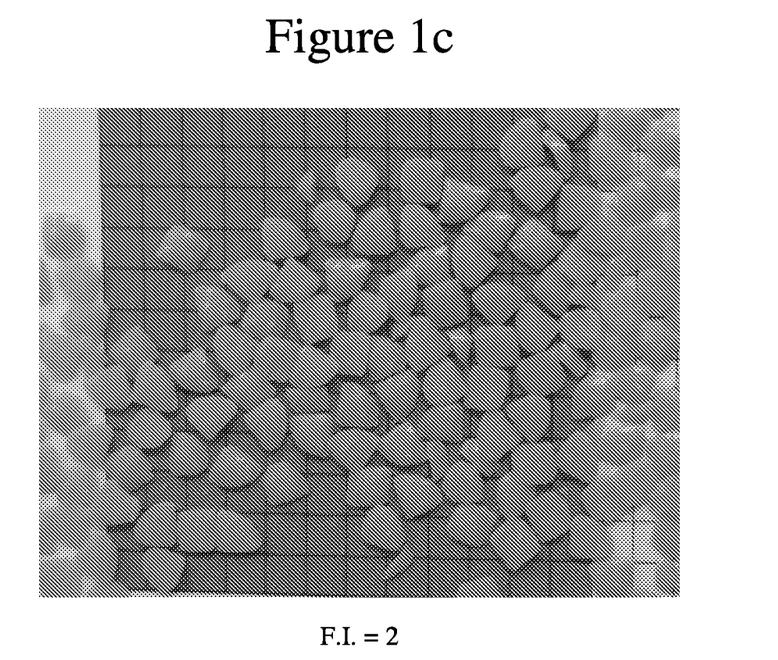
Figure 1D:
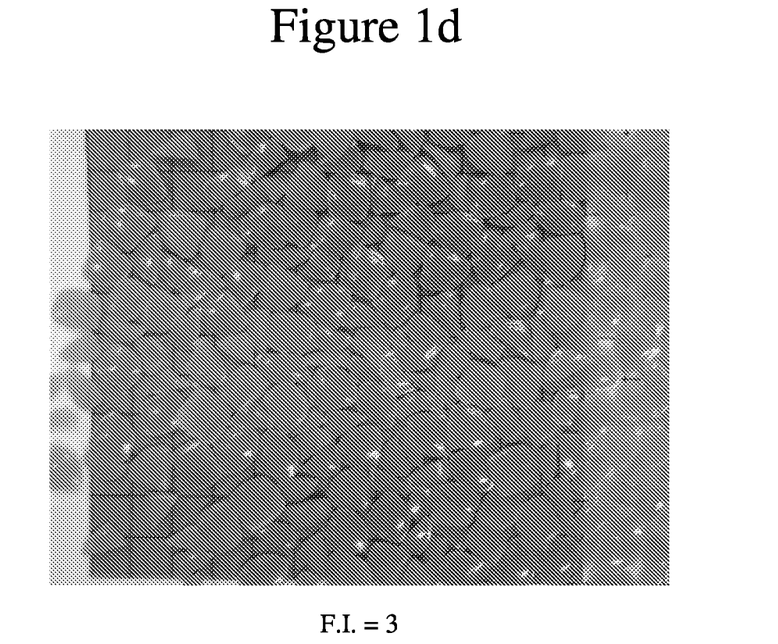
Figure 1E:
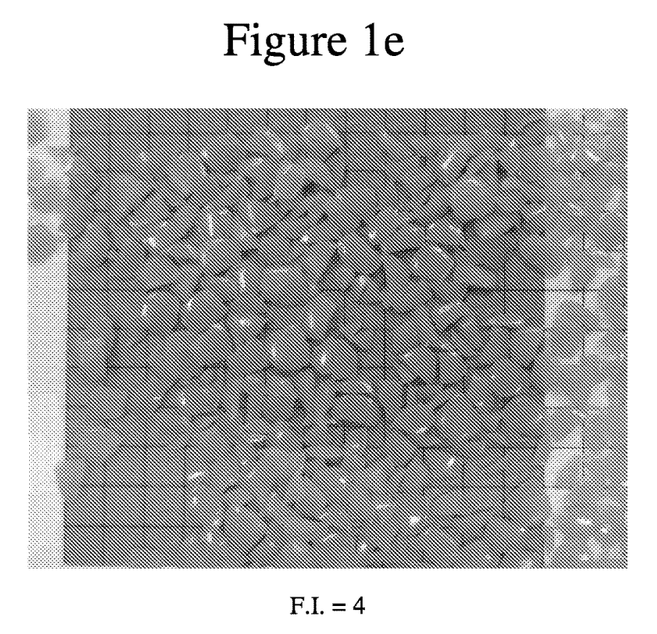
Figure 1F:
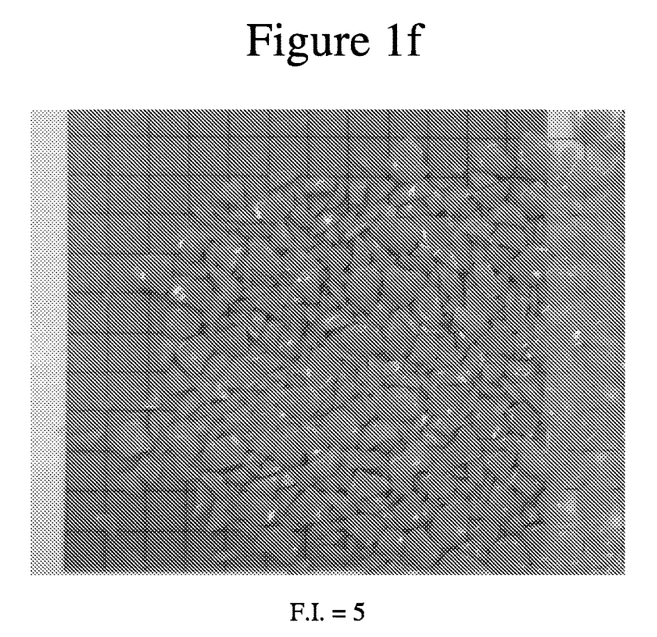

Fracture Index (FI) was determined visually by trained panelists against similar reference samples after at least two weeks storage of sealed samples at ambient temperature. See, for example, FIG. 1, which depicts a representative Fracture Index (FI) reference chart for ⅛ inch randomly shaped fine flakes (each square on the chart representing 2 millimeters in length on a side). The FI is established to be in the range from zero to 5, FI zero corresponding to no broken particles (FIG. 1a), FI 1 to greater than 90% whole particles by number (FIG. 1b), FI 2 to greater than 80% whole particles (FIG. 1c), FI 3 to about 50% whole particles (FIG. 1d), FI 4 to less than 30% whole particles (FIG. 1e), and FI 5 corresponding to less than 10% whole particles (FIG. 10. Reading FI 2.5 was considered as border-line acceptable, and FI 3.0 corresponded to border-line failure. FI was determined to be 5 for the sample of this comparative Example 1.

Example 2

A number of encapsulation matrix compositions have been tested by modifying the composition of Example 1 as shown in the Table. The Table shows Fracture Index of OSAN modified starch—dextrose matrix compositions containing fibers and gums. The equivalent amount of OSAN starch has been replaced in the compositions with the equivalent amount of insoluble fibers and their combinations with gums. The process of the Example 1 was used for all compositions. In addition to Fracture Index determined after two weeks of storage, for some of the better performing composition an additional stress-test was used. It included 10 minute shaking using a TURBULIZER™ mixer, a three-dimensional mixer. Resultant FI was also reported for comparison.

TABLE

| Sample Number | Modifying Ingredients | Moisture % w/w | Fracture Index, FI | FI after Turbulizer | Comment |
|---|---|---|---|---|---|
| 1 | Control - none | 6 | 5 | | Composition of Example 1 |
| 2 | 5% xanthan | 6.8 | 1 | 1 | Xanthan gum, microbial origin |
| 3 | 3% xanthan | 9.9 | 3.5 | 5 | Xanthan gum, microbial origin |
| 4 | 3% CMC | 6.1 | 4 | 5 | Carboxymethyl cellulose |
| 5 | 5% cellulose gum | 6.2 | 4 | 5 | Microcrystalline + Carboxymethyl cellulose |
| 6 | 4.95% pectin | 5.3 | 2.5 | 2.5 | High methoxy pectin |
| 7 | 3% xanthan + 2% sugarcane fiber | 6.1 | 0.5 | 1 | |
| 8 | 5% sugarcane fiber | 5.6 | 0 | 0 | |
| 9 | 3% sugarcane fiber | 6.4 | 0 | 1 | |
| 10 | 5% Konjac gum | 6 | 4 | 5 | |
| 11 | 5% oat fiber | 5.3 | 1 | 2 | |
| 12 | 5% rice fiber | 6.2 | 0 | 0 | FI = 1 after 15 min drying at 200° F. |
| 13 | 2% xanthan + 2% sugarcane fiber | 6.6 | 0 | 0.5 | |
| 14 | 5% corn fiber | 5.8 | 0.5 | 1 | |
| 15 | 5% rice concentrate | | 2 | 3 | 15 min drying at 200° F |
| 16 | 5% apple fiber | | 2 | 4 | |
| 17 | 5% wood fiber | 5.9 | 0 | 0 | |

The data shown in the Table shows that insoluble fibers and their combinations with gums dramatically improve integrity of the particles and their resistance to stress in processing and breaking. Especially noteworthy results were demonstrated for oat fiber, wood fiber, rice fiber, sugarcane fiber and combinations of sugarcane fiber and xanthan gum.

In addition to improvement in the structural integrity of the particles, the amount or number of broken particles in a sample can affect the appearance of the sample as well. The larger the number of broken particles in a sample, the less translucent the sample may appear. And consistency in appearance can be an important consideration for potential customers.

As described above, it has been found that for a variety of matrices and particle shapes that the drying process can result in the development of cracks and ultimately fracturing of particles to the detriment of the encapsulated product. As described herein, it has been discovered that certain fibers included in the composition can improve structural integrity and produce a variety of additional positive effects, such as: prevent or minimize fracturing of the particles thus preserving particle integrity and flavor functionality among other things (for example, stability against fracturing of the particles in a sealed packaging for at least six months at ambient temperature); help preserve the particle shape and size through a variety of processing conditions; help preserve the flavor characteristics of the particle; help protect the particle against oxidation; improve the storage and handling all the way to application; help prevent caking of the particles; etc.

While the improvement in the breakage rate of the particles in storage, transport and handling among other things has been demonstrated to various degrees as disclosed above, where any particular product will fall can depend on such things as the particular matrix, the particular encapsulate, particle shape, the particular fiber, drying conditions, etc. In fact, with the proper selection of the above, virtually 100% (less than 1%) of the particles produced will remain unbroken through additional processing.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A particulate extrusion encapsulation product, comprising: (A) an encapsulate, encapsulated in (B) a glassy matrix comprising at least one modified starch, and at least one low molecular weight carbohydrate, wherein the glassy matrix additionally contains about 0.5% to about 10% by weight of at least one insoluble fiber selected from the group consisting of apple fiber, corn fiber, sugarcane fiber, oat fiber, wood fiber, rice fiber, and mixtures thereof, wherein the average size of the fibers is about 20 to about 300 microns, and wherein at least 80% of the particles in the particulate product are unbroken after at least two weeks storage of sealed samples at ambient temperature, based on total number of particles in the particulate product, resulting in improved structural integrity of the product as compared to said product which does not contain the at least one insoluble fiber.

2. The product of claim 1, wherein the insoluble fiber comprises about 3% to about 8% by weight.

3. The product of claim 1, wherein at least 85% of the particles in the particulate product are unbroken, based on total number of particles in the particulate product.

4. The product of claim 1, wherein at least 90% of the particles in the particulate product are unbroken, based on total number of particles in the particulate product.

5. The product of claim 1 wherein the average size of the fibers is about 50 to about 200 microns.

6. The product of claim 1 wherein the average size of the fibers is about 75 to about 150 microns.

7. The product of claim 1, wherein the matrix contains about 49% to about 94% by weight of the modified starch and about 5% to about 50% of the low molecular weight carbohydrate.

8. The product of claim 1, wherein the low molecular weight carbohydrate has an average molecular weight less than about 800 g/mol.

9. The product of claim 1, wherein the low molecular weight carbohydrate comprises a sugar, polyol, corn syrup solid, or mixtures thereof.

10. The product of claim 1, wherein the amount of encapsulate contained in the product is from about 0.01% to about 20% by weight, based on the total weight of the extrusion encapsulation product.

11. The product of claim 1, wherein the amount of encapsulate contained in the product is from about 4% to about 12% by weight, based on the total weight of the extrusion encapsulation product.

12. The product of claim 1, wherein the amount of encapsulate contained in the product is from about 8% to about 10% by weight, based on the total weight of the extrusion encapsulation product.

13. The product of claim 1, wherein the amount of encapsulate contained in the product is at least 8% by weight, based on the total weight of the extrusion encapsulation product.

14. The product of claim 1, wherein the particulate product has an average particle size of 0.1 mm to 7 mm.

15. The product of claim 1, wherein the particulate product has an average particle size of 0.3 mm to 3 mm.

16. The product of claim 1, wherein the particulate product particles has have an average particle size of 0.6 mm to 2 mm.

17. The product of claim 1, wherein the particulate product has a glass transition temperature of from 25° C. to 80° C.

18. The product of claim 1, wherein the modified starch comprises n-octenylsuccinic acid anhydride modified starch.

19. The product of claim 1, wherein the low molecular weight carbohydrate comprises maltose, trehalose, dextrose, lactose, fructose, xylose, sucrose, corn syrup solids, erythritol, maltitol, mannitol, xylitol, sorbitol, lactitol or mixtures thereof.

20. The product of claim 1, wherein the encapsulate comprises a flavor, fragrance, vitamin, dietary supplement, medication or mixtures thereof.

21. The product of claim 1, wherein the encapsulate comprises a flavor.

22. The product of claim 21, wherein the flavor is a natural flavor, natural extract, oleoresin, essential oil, protein hydrolyzate, reaction flavor, artificial flavor, compounded flavor or mixtures thereof.

23. The product of claim 1, additionally containing a plasticizer comprising water, glycerin, propylene glycol, carbohydrate solution or mixtures thereof.

24. The product of claim 1, wherein the glassy matrix contains up to 2% by weight of an anti-sticking agent.

25. The product of claim 24, wherein the anti-sticking agent comprises a calcium, magnesium, sodium, or potassium salt of a fatty acid; beeswax; carnauba wax; candelilla wax; silicon dioxide; titanium dioxide; or mixtures thereof.

26. The product of claim 1, additionally containing up to 70% by weight maltodextrin.

27. The product of claim 1 additionally containing up to 10% by weight of at least one gum.

28. The product of claim 27 wherein the gum comprises xanthan gum, alginate, carrageenan, pectin or mixtures thereof.

29. A method of making a particulate extrusion encapsulation product comprising: (i) in an extruder assembly, mixing and melting matrix components comprising a matrix and an encapsulate to form a viscous dispersion, (ii) shaping, extruding, and die-face cutting the viscous dispersion to obtain a particulate extrusion encapsulation product, and (iii) drying and cooling the particulate extrusion encapsulation product to a glassy state, wherein the matrix components additionally contain about 0.5% to about 10% by weight of at least one insoluble fiber selected from the group consisting of apple fiber, corn fiber, sugarcane fiber, oat fiber, wood fiber, rice fiber, and mixtures thereof, wherein the average size of the fibers is about 20 to about 300 microns, and wherein at least 80% of the particles in the particulate product are unbroken after at least two weeks storage of sealed samples at ambient temperature, based on total number of particles in the particulate product, resulting in improved structural integrity of the product as compared to said product which does not contain the at least one insoluble fiber.

30. The method of claim 29, wherein the encapsulate comprises a flavor.

31. The product of claim 30, wherein the flavor is a natural flavor, natural extract, oleoresin, essential oil, protein hydrolyzate, reaction flavor, artificial flavor, compounded flavor or mixtures thereof.

32. The method of claim 29, additionally containing up to about 70% by weight maltodextrin.

33. The method of claim 29 additionally containing up to about 10% by weight of at least one gum.

34. The method of claim 33 wherein the gum comprises xanthan gum, alginate, carrageenan, pectin or mixtures thereof.

35. A food system containing the particulate extrusion encapsulation product of claim 1.

36. The food system of claim 35 wherein the product is topically applied and/or mixed internally into the system.

37. The food system of claim 35 comprising extruded cereal, crackers, cereal bars, snack chips, dough, bakery products, and dry beverage blends.

* * * * *

UNITED STATES PATENT AND TRADEMARK OFFICE
CERTIFICATE OF CORRECTION

PATENT NO. : 11,026,446 B2
APPLICATION NO. : 16/064777
DATED : June 8, 2021
INVENTOR(S) : D. Zasypkin et al.

Page 1 of 1

It is certified that error appears in the above-identified patent and that said Letters Patent is hereby corrected as shown below:

In the Claims

At Column 11, Line 34 (Claim 16), please change "has have" to -- have --.

Signed and Sealed this
Second Day of November, 2021

Drew Hirshfeld
*Performing the Functions and Duties of the
Under Secretary of Commerce for Intellectual Property and
Director of the United States Patent and Trademark Office*